(12) United States Patent
Neuman et al.

(10) Patent No.: US 8,103,129 B2
(45) Date of Patent: Jan. 24, 2012

(54) SYSTEM(S), AND METHOD(S) FOR NON-LINEAR SCALING OF SOURCE PICTURES TO A DESTINATION SCREEN

(75) Inventors: Darren Neuman, Palo Alto, CA (US); Satheesh Babu, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1010 days.

(21) Appl. No.: 12/017,243

(22) Filed: Jan. 21, 2008

(65) Prior Publication Data
US 2009/0184891 A1    Jul. 23, 2009

(51) Int. Cl.
*G06K 9/32* (2006.01)
*G09G 3/20* (2006.01)

(52) U.S. Cl. .......................................... 382/298; 345/55
(58) Field of Classification Search .......... 382/298–300, 382/312; 345/660, 690, 698, 55; 348/440, 348/441, 581; 375/240.1
See application file for complete search history.

(56) References Cited

U.S. PATENT DOCUMENTS

| 5,400,044 | A | * | 3/1995 | Thomas | 345/690 |
| 5,528,301 | A | * | 6/1996 | Hau et al. | 348/441 |
| 6,774,952 | B1 | * | 8/2004 | Ratcliffe | 348/581 |
| 7,474,696 | B2 | * | 1/2009 | Washino | 375/240.01 |
| 7,542,053 | B2 | * | 6/2009 | Berenguer et al. | 345/660 |
| 7,570,120 | B1 | * | 8/2009 | Esposito | 331/1 A |

* cited by examiner

*Primary Examiner* — Kanjibhai Patel
(74) *Attorney, Agent, or Firm* — Thomas, Kayden, Horstemeyer & Risley, LLP

(57) ABSTRACT

Presented herein are system(s), and method(s) for non-linear scaling of source pictures to a destination screen. In one embodiment, there is presented a monitor for displaying a source picture. The monitor comprises a screen and a circuit. The screen comprises a plurality of columns, including at least one center column, a plurality of left columns, and a plurality of right columns. The circuit provides pixels for display at each of the plurality of columns of a source picture that are indicated by the phase accumulator. The phase accumulator is incremented by step values that are continuous with respect to the plurality of columns.

21 Claims, 4 Drawing Sheets

Source Picture 100(a,b)

Circuit 107

Destination Screen 105(x,y)

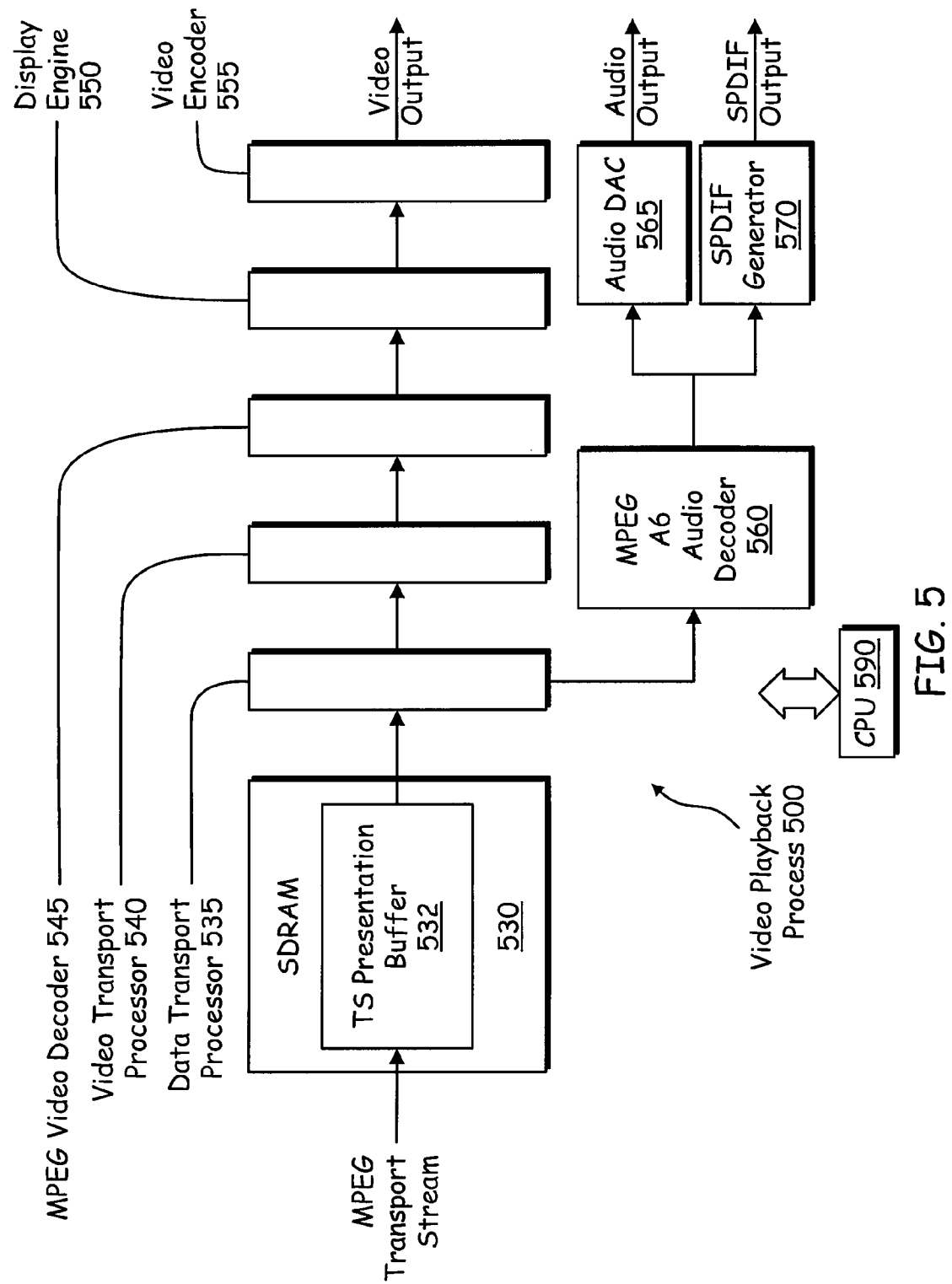

SYSTEM(S), AND METHOD(S) FOR NON-LINEAR SCALING OF SOURCE PICTURES TO A DESTINATION SCREEN

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A common problem occurs when attempting to display 4×3 (4:3) video on a 16:9 display screen. Linear scaling of the picture results in a black bar on either side of the picture. In order to utilize the entire screen, the picture can be non-linearly scaled.

However, non-linear scaling can result in a picture that has discontinuous scaling which is noticeable at the point of the discontinuity.

Further limitations and disadvantages of conventional and traditional approaches will become apparent to one of skill in the art, through comparison of such systems with embodiments of the present invention as set forth in the remainder of the present application.

BRIEF SUMMARY OF THE INVENTION

The present invention is directed to systems and methods for non-linear scaling of 4:3 source material to a 16:9 display as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 5 is a block diagram of an exemplary decoder system in accordance with an embodiment of the present invention.

DETAILED DESCRIPTION OF THE INVENTION

Figure 1:
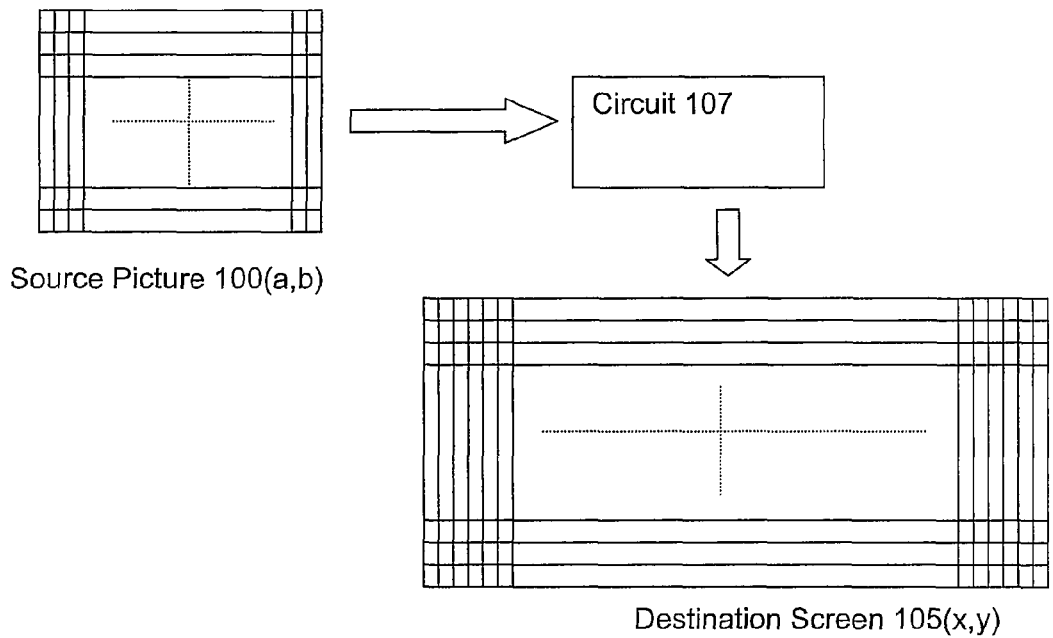
FIG. 1 is a block diagram describing an exemplary source picture displayed on a destination screen in accordance with an embodiment of the present invention.

Referring now to FIG. 1, there is illustrated a block diagram of a monitor 102 for displaying a source picture 100 on a destination screen 105, in accordance with an embodiment of the present invention. The source picture 100 comprises a two-dimensional grid(s) of pixels, 100($a,b$). The destination screen 105 comprises a two-dimensional grid, 105($x,y$).

It is noted that the dimensions of the source picture a:b and the dimensions of the destination screen 105, x:y are not necessarily equal. Additionally, the ratio of the dimensions, a/b and x/y may also be different. Scaling the vertical dimension of the source picture, b by a factor, y/b will fit the source picture to the height of the destination. However, scaling the horizontal dimension by the same factor does not necessarily fit the source picture 100 to the width of the destination screen 105. Either some columns in the destination screen are unused or some columns in the source picture 100 appear outside the destination screen 105. Scaling the horizontal dimension by a constant factor to the width of the destination screen 105 results in a distorted appearance.

To display the source picture 100 to the destination screen 105, a circuit 107 scales the width by using a step factor that continuously varies for each of the columns. Initially, the leftmost columns 100(0,b) of the source picture 100 and the destination source 105(0,y) are aligned. Each successive column of the destination source 105(1 . . . , y) is mapped to a new column value by adding the step value to the column value of the previous column.

For example, the mapped column for column 105(5,y)=the mapped column for column 105(4,y)+step value for column 5. In certain embodiments of the present invention, the step value varies for each of the columns and is continuous over each of the columns 105( ,y).

In certain embodiments of the present invention, where a column of the destination screen is mapped to a column value that includes a fractional portion, a pixel can be interpolated from pixels in the adjacent integer columns.

It is noted that although the destination screen 105 is longer than the monitor 102 in the horizontal direction, the invention can be used where the destination screen 105 is longer than the monitor 102 in the vertical direction, as well.

Figure 2:
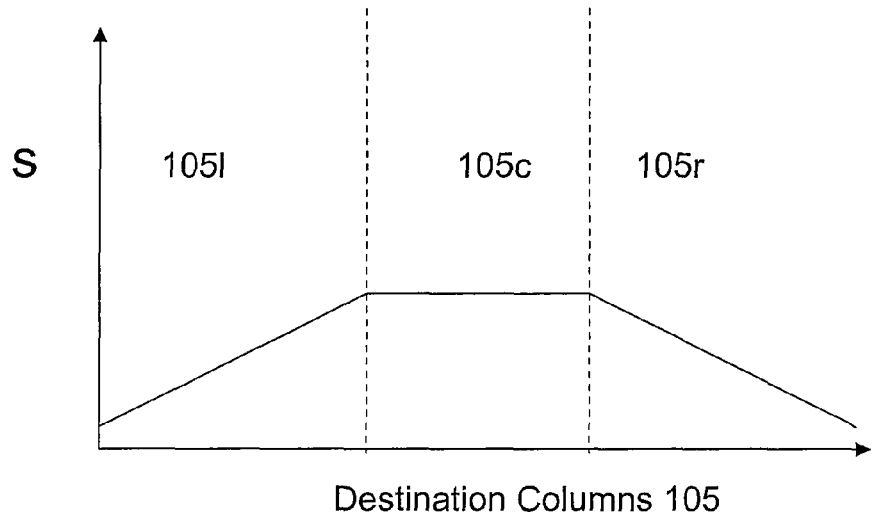
FIG. 2 is an exemplary graph of the step value as a function of the column in accordance with an embodiment of the present invention.

Referring now to FIG. 2, there is illustrated a graph of the step factor, s, as a function of the destination column, 105( ,y), in accordance with an embodiment of the present invention. The destination columns 105( ,y) include left columns 105$l$, at least one center column 105$c$, and right columns 105$r$. For the center columns, the step factor is constant. However, the step factor decreases for the left columns 105$l$ and right columns 105$r$ for the columns that are farther away from the at least one center column 105$c$. In certain embodiments of the present invention, the step factor s can be linear in the left columns 105$l$ and right columns 105$r$. If the step factor s is linear in the left columns 105$l$ and right columns 105$r$, the step factor can be incremented by delta factors +d, −d in the left columns 105$l$ and right columns 105$r$, respectively. For example, the step factor s for column 105(5,y) can be the step factor for column 105(4,y)+delta factor.

It is also noted that the foregoing can also be used with destination rows. For example, in the foregoing description, the left columns can correspond to top rows, the right columns can correspond to bottom rows, and the center column can correspond to center rows. The step factor can decreases for the top rows and bottom rows for the rows that are farther away from the at least one center row.

Figure 3:
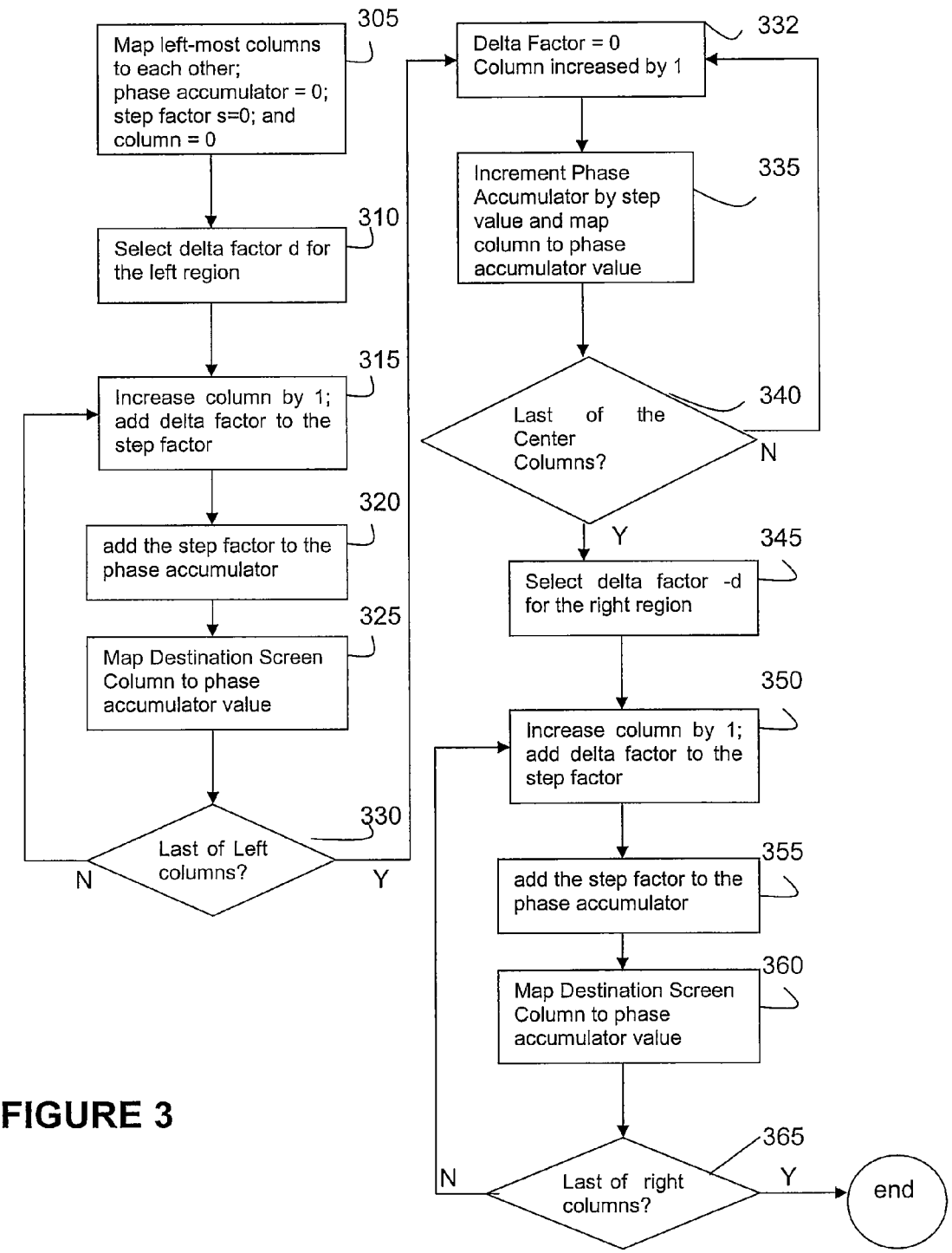
FIG. 3 is a flow diagram for mapping columns of a destination screen to a source picture in accordance with an embodiment of the present invention.

Referring now to FIG. 3, there is illustrated a flow diagram for mapping columns 105( ,y) in the destination screen to columns in the source picture 100. At 305, column 105(0,y) is mapped to column 100(0,b), and phase accumulator=0, step factor s=0, and destination screen column=0. At 310, the delta factor d for the left region is selected.

At 315, the column number is increased by 1, the step factor s is incremented by the delta factor d. At 320, the phase accumulator is incremented by the step value. At 325, the destination screen column is mapped to the phase accumulator value.

At 330, a determination is made whether the column was the last column of the left columns by examining the column number. If at 330, the column is not the last column of the left columns, 315 is repeated.

If at 330, the column is the last column of the left columns, the delta factor is set to zero and the column is incremented by 1 at 332. At 335, the phase accumulator is incremented by the step value and the column is mapped to the phase accumulator value. At 340, a determination is made whether the column is the last column of the center columns. If the column is not the last column of the center columns, 332 is repeated.

At 345, the delta factor −d for the right region is selected. At 350, the column number is increased by 1, the step factor s is incremented by the delta factor −d. At 355, the phase accumulator is incremented by the step value. At 360, the destination screen column is mapped to the phase accumulator value. At 365, a determination is made whether the last column of the destination screen is reached. If the last column of the destination screen is not reached, 350 is repeated. If the last column of the destination screen is reached at 365, the process is completed.

In certain embodiments of the present invention, the circuit 107 can include a memory storing instructions for execution by processor, wherein execution of the instructions by the processor causes the performance of the flow chart described in FIG. 3. It is also noted that the foregoing can be implemented with vary few programmed parameters, such as the delta values d, −d, and the number of columns in the left columns, center columns, and right columns.

It is also noted that the foregoing can also be used with destination rows. For example, in the foregoing description, the left columns can correspond to top rows, the right columns can correspond to bottom rows, and the center column can correspond to center rows. The step factor can decreases for the top rows and bottom rows for the rows that are farther away from the at least one center row.

Figure 4:
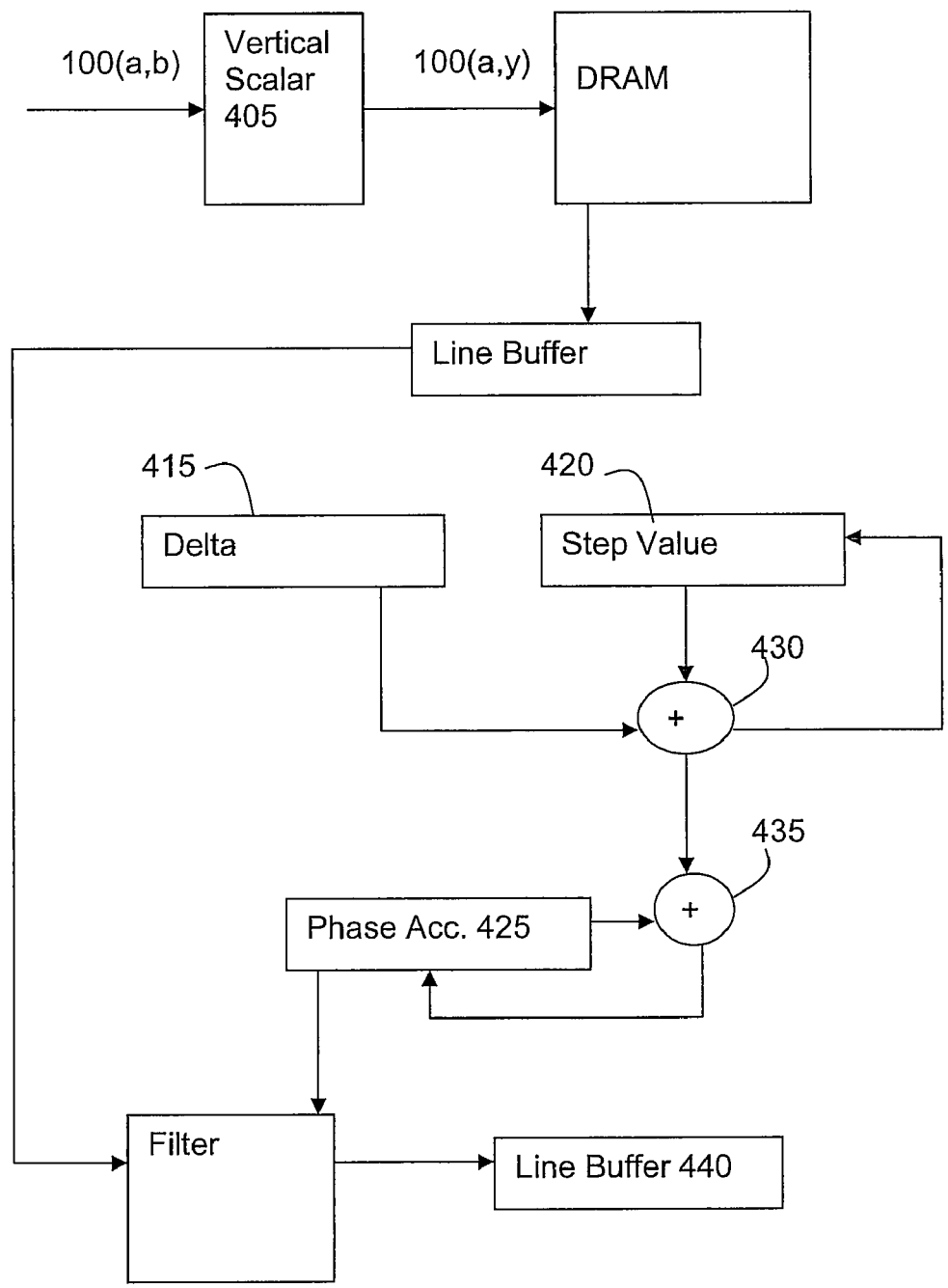
FIG. 4 is a block diagram of an exemplary scalar in accordance with an embodiment of the present invention.

Referring now to FIG. 4, there is illustrated a block diagram of an exemplary circuit 400 for scaling a source picture 100 to a destination screen 105. The circuit 400 comprises a vertical scalar 405 for vertically scaling the source picture 100(a,b), thereby resulting in a horizontally scaled source picture 100(a,y). The horizontally scaled source picture 100(a,y) is stored in memory. In certain embodiments of the present invention, off-chip memory such as DRAM store the vertically scaled source picture.

Horizontal scalar 410 includes a line buffer for storing a particular line of the horizontally scaled source picture. The horizontal scalar 410 includes a first register 415 for storing the delta value, d, 0, −d, a second register 420 for storing the step value, and a phase accumulator 425. Adder 430 adds the delta value to the step value stored in the second register 420. Adder 435 adds the step value to the phase accumulator 425.

A filter receives the value from the phase accumulator 425 and generates a pixel value for the line at a particular destination screen column by interpolating from the pixels in the columns of vertically scaled source picture that are indicated by the accumulator 425. The output of the filter is stored in another line buffer 440 for output to a display device. A processor 445 can be used to control the foregoing components. The delta values, d, −d, and number of left columns and center columns can be stored in on-chip memory such as SRAM.

In certain embodiments of the present invention, the delta values can be varied by the user. Additionally, the number of center columns can also be varied by the user.

It is also noted that the foregoing can also be used with destination rows. For example, in the foregoing description, the left columns can correspond to top rows, the right columns can correspond to bottom rows, and the center column can correspond to center rows. The step factor can decreases for the top rows and bottom rows for the rows that are farther away from the at least one center row. The modifications to the horizontal scalar would apply instead to the vertical scalar.

It is noted that the circuit 400 can be used alongside among various compression standards and in other devices such as, but not limited to set top boxes and DVD players. Referring now to FIG. 5, there is illustrated a block diagram of an exemplary decoder in accordance with an embodiment of the present invention.

Data is output from buffer 532 within SDRAM 530. The data output from the buffer 532 is then passed to a data transport processor 535. The data transport processor 535 demultiplexes the transport stream into packetized elementary stream constituents, and passes the audio transport stream to an audio decoder 560 and the video transport stream to a video transport decoder 540 and then to a MPEG video decoder 545. The audio data is then sent to the output blocks, and the video is sent to a display engine 550. The display engine 550 scales the video picture, renders the graphics, and constructs the complete display. Once the display is ready to be presented, it is passed to a video encoder 555 where it is converted to analog video using an internal digital to analog converter (DAC). The digital audio is converted to analog in an audio digital to analog (DAC) 565. In certain embodiments of the present invention, the circuit 400 can form a portion of the display engine 550.

The systems as described herein may be implemented as a board level product, as a single chip, application specific integrated circuit (ASIC), or with varying levels of the systems integrated with other portions of the system as separate components. The degree of integration of the decoder system will primarily be determined by the speed and cost considerations.

Because of the sophisticated nature of modern processors, it is possible to utilize a commercially available processor, which may be implemented external to an ASIC implementation. Alternatively, if the processor is available as an ASIC core or logic block, then the commercially available processor can be implemented as part of an ASIC device wherein various operations are implemented in firmware.

While the invention has been described with reference to certain embodiments, it will be understood by those skilled in the art that various changes may be made and equivalents may be substituted without departing from the scope of the invention.

In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for scaling a source picture to a destination screen comprising a plurality of columns, said method comprising:
   incrementing a phase accumulator for each of the plurality of columns;

determining horizontal positions from the source picture based on the contents of the phase accumulator for each of the plurality of columns;
associating pixels at the horizontal positions to each of the plurality of columns;
outputting the pixels for display at the plurality of columns associated with the pixels; and
wherein the phase accumulator is incremented by an incremental value, and wherein the incremental value is continuous.

2. The method of claim 1, wherein the plurality of columns comprises at least one center column, and wherein the incremental value is constant for each of the at least one center columns.

3. The method of claim 2, wherein the plurality of columns comprises left columns, and wherein the incremental value for each of the left columns varies inversely with distances of each of said left columns to the at least one center columns.

4. The method of claim 3, wherein the plurality of columns comprises right columns, and wherein the incremental value for each of the right columns varies inversely with distances of each of said right columns to the at least one center columns.

5. The method of claim 4, wherein the incremental value varies linearly for the right columns and linearly for the left columns.

6. The method of claim 1, wherein the incremental value is varying.

7. A circuit for scaling a source picture to a destination screen comprising a plurality of columns, said circuit comprising:
a phase accumulator for indicating columns in the source picture for each of the plurality of columns;
a register for storing an step value for the phase accumulator for each of the plurality of columns;
another register for storing a delta value for the step value for each of the columns;
wherein the step value is added to the phase accumulator for each of the plurality of columns, wherein the step value is continuous;
an output for providing pixels for display, wherein the pixels for each of the plurality of columns of the destination screen are in a column indicated by the phase accumulator.

8. The circuit of claim 7, wherein the plurality of columns comprises at least one center column, and wherein the step value is constant for each of the at least one center columns.

9. The circuit of claim 7, wherein the plurality of columns comprises left columns, and wherein the step value for each of the left columns varies inversely with distances of each of said left columns to the at least one center columns.

10. The circuit of claim 9, wherein the plurality of columns comprises right columns, and wherein the step value for each of the right columns varies inversely with distances of each of said right columns to the at least one center columns.

11. The circuit of claim 10, wherein the step value varies linearly for the right columns and linearly for the left columns.

12. A monitor for displaying a source picture, said monitor comprising:
a screen comprising a plurality of columns, said plurality of columns comprising at least one center column, a plurality of left columns, and a plurality of right columns; and
a circuit for providing pixels for display at each of the plurality of columns of the screen based on pixels from the source picture, wherein the pixels are a function of pixels in columns of a source picture that are indicated by a phase accumulator, wherein the phase accumulator is incremented by step values, said step values being continuous with respect to the plurality of columns.

13. The monitor of claim 12, wherein the plurality of columns comprises at least one center column, and wherein the step value is constant for each of the at least one center columns.

14. The monitor of claim 13, wherein the plurality of columns comprises left columns, and wherein the step value for each of the left columns varies inversely with distances of each of said left columns to the at least one center columns.

15. The monitor of claim 14, wherein the plurality of columns comprises right columns, and wherein the step value for each of the right columns varies inversely with distances of each of said right columns to the at least one center columns.

16. The monitor of claim 15, wherein the step value varies linearly for the right columns and linearly for the left columns.

17. A monitor of claim 12, wherein the circuit further comprises:
the phase accumulator for indicating columns in the source picture for each of the plurality of columns;
a register for storing the step value for the phase accumulator for each of the plurality of columns;
another register for storing a delta value for the step value for each of the columns; and
wherein the step value is added to the phase accumulator for each of the plurality of columns.

18. The monitor of claim 17, wherein the delta value is added to the step value for each of the plurality of columns.

19. The monitor of claim 17, wherein the circuit further comprises a vertical scalar for vertically scaling the source picture, thereby resulting in a vertically scaled source picture.

20. The monitor of claim 19, further comprising:
a filter for generating values for the pixels, wherein the values generated for the pixels are a function of columns in the vertically scaled source picture that are indicated by the phase accumulator.

21. A system for displaying a source picture on a screen comprising a plurality of columns, said plurality of columns comprising at least one center column, a plurality of left columns, and a plurality of right columns, said system comprising:
a circuit for providing pixels for display at each of the plurality of columns of the screen based on pixels from the source picture, wherein the pixels are a function of pixels in columns of a source picture that are indicated by a phase accumulator, wherein the phase accumulator is incremented by step values, said step values being continuous with respect to the plurality of columns.

* * * * *